United States Patent [19]

Shiang et al.

[11] Patent Number: 4,921,278
[45] Date of Patent: May 1, 1990

[54] IDENTIFICATION SYSTEM USING COMPUTER GENERATED MOIRE

[75] Inventors: Lu P. Shiang; Duanfeng He, both of Beijing, China

[73] Assignee: Chinese Academy of Sciences, Beijing, China

[21] Appl. No.: 270,422

[22] Filed: Nov. 9, 1988

Related U.S. Application Data

[63] Continuation of Ser. No. 846,266, Mar. 31, 1986, abandoned.

[30] Foreign Application Priority Data

Apr. 1, 1985 [CN] China ............................ 85100700

[51] Int. Cl.$^5$ .................... B42D 15/00; G06K 9/00; G06K 7/10; G03H 1/02
[52] U.S. Cl. .................................................. 283/87
[58] Field of Search ............... 283/72, 87, 107; 382/2, 382/4, 5, 65; 356/354, 361, 121, 122, 96, 3.81, 3.83; 235/473

[56] References Cited

U.S. PATENT DOCUMENTS

| | | | |
|---|---|---|---|
| 2,952,080 | 9/1960 | Avakian et al. | |
| 3,125,812 | 3/1964 | Simpson. | |
| 3,156,051 | 11/1964 | Hughes | 283/87 |
| 3,234,663 | 2/1966 | Ferris et al. | |
| 3,238,837 | 3/1966 | Woodcock. | |
| 3,256,767 | 6/1966 | Bousky. | |
| 3,455,577 | 7/1969 | Kikumoto. | |
| 3,483,513 | 12/1969 | Burckhardt. | |
| 3,620,590 | 11/1971 | Barker. | |
| 3,647,275 | 3/1972 | Ward | 283/70 |
| 3,668,795 | 6/1972 | Barker. | |
| 3,898,424 | 8/1975 | Bigelow et al. | 235/473 |
| 4,025,898 | 5/1977 | Shaw | 382/4 |
| 4,055,833 | 10/1977 | Rothfjell | 382/2 |
| 4,120,559 | 10/1978 | Abramson et al. | 350/3.6 |
| 4,211,918 | 7/1980 | Nyfeler et al. | 283/70 |
| 4,376,950 | 3/1983 | Brown et al. | 350/3.6 |
| 4,478,481 | 10/1984 | Fusek et al. | 350/3.6 |
| 4,480,177 | 10/1984 | Allen | 235/468 |
| 4,532,508 | 7/1985 | Ruell | 283/4 |
| 4,541,113 | 9/1985 | Seufert et al. | 382/4 |
| 4,584,704 | 4/1986 | Ferren | 382/65 |
| 4,656,473 | 4/1987 | Goldman et al. | 356/71 |

FOREIGN PATENT DOCUMENTS

| | | | |
|---|---|---|---|
| 488652 | 4/1976 | Australia | 283/72 |
| 73762 | 11/1977 | Australia | 283/72 |
| 1188302 | 4/1970 | United Kingdom. | |

OTHER PUBLICATIONS

The Recognition of Faces by Leon D. Harmon on Scientific American, Nov., 1973, class 382/2.

Primary Examiner—Douglas D. Watts
Assistant Examiner—Paul M. Heyrana
Attorney, Agent, or Firm—Kenyon & Kenyon

[57] ABSTRACT

A computer generated moire identification system mainly uses two kinds of computer generated grids, one called object grids, and the other, reference grids. An object grid is used as an information carrier. The necessary specific information for identification such as the owner's signature or photograph is read into a computer, which codes the information into a grid, and then prints the code information onto an I/D plate or card. It is impossible to find out the hidden information by merely inspecting this plate. However, the coded information will reappear when the I/D plate is placed in a read-out machine, where the reference grid decodes the coded information in the form of Moire patterns.

5 Claims, 2 Drawing Sheets

IDENTIFICATION SYSTEM USING COMPUTER GENERATED MOIRE

This application is a continuation of application Ser. No. 06/846,266, filed Mar. 31, 1986, now abandoned.

BACKGROUND OF THE INVENTION

This invention relates to identification systems in general and, more particularly, to an identification system using Computer Generated Moire (CGM).

Everyday and every single moment, important valid private identifications/documents (hereafter I/D's) are lost, stolen or counterfeited throughout the world. As I/D's are used for various purposes, once they fall into wrong hands, which on numerous occasions, results in signatures being imitated and used illegally, tremendous financial losses may be caused to the owners of the I/D's and the organizations that issued the I/D's.

The most frequent approach at present to stop or to reduce the illegal usage of a stolen/lost I/D is to provide a magnetic strip on it, and a computer read-out is used to verify this I/D card. Nevertheless, such verifications can only be done within the aid of computer terminals. Consequently, when those cards are used outside the network of 9 computer designated by the organization that issued the I/D's, such as abroad, computer verification is practically impossible.

Various systems hve been proposed to code the necessary specific information for I/D's. In the optical field, encoding and decoding techniques are disclosed in the following U.S. patents: 3,455,577 (U.V. or I.R. illumination of fluorescent material); 3,125,812 (fiber optic encoding and decoding of signature); 2,952,080 (crystographic grid scrambler information); 3,238,837 (multifiber image encoding and decoding); 3,256,767 (fiber optic scanning for encoding and decoding); 3,156,051 (random dot card and lens system); and 3,234,663 (film coding with different wavelength light sources). Several newer approaches based on the applications of holograms have been adopted lately, as disclosed in U.S. patents 3,647,275; 3,620,590; 3,668,795 (reference beam coded holograms); 3,483,513; 48,373; Swiss pat. 451,571; British pat. 1,188,302 (optical filtering based on Fourier holograms for pattern recognition) and U.S. Pat. No. 4,120,559 (sandwich holograms). Based on optical principles, these inventions are operative beyond the confinement of computer connections. But although a number of optical systems described in these patents provide secruity to some extent, they generally suffer from a variety of practical problems, for example, the expense, or complexity in commercial use. On the other hand, a number of other systems meet the cost requirements, but unfortunately do not provide the required level of security. More recently, some credit cards used embossed holograms, which have made counterfeiting more difficult, yet have not improved much on safeguarding against illegal usage of stolen/lost I/D's.

SUMMARY OF THE INVENTION

This invention is based on the application of Computer Generated Moire (CGM), and can provide a good proof to facilitate and safeguard the proper usage of I/D's. CGM has been mainly developed by Aldof W. Lohmann and Po- shiang Lu for profile testing. This method has some advantages contrasting with the conventional Moire method.

What is Computer Generated Moire? Ordinarily, Moire is produced by superposing two grids. Moire effect can be used for many applications such as testing the profile of a body, or testing the quality of a grating. Until now, regular straight-line gratings have been used in most cases for the grids, because the Moire patterns formed by simple grids is easy to interpret by physics principles, but interesting Moire patterns can also be generated if the two grids are not so simple. For example, the superposition of two Fresnel Zone Plates produces straight equidistant Moire fringes called "Schuster fringes". Even more general grid structures will produce an infinitely large variety of Moire patterns, or in reverse, a specific pattern can be produced by an infinitely large set of suitable grid pairs. It is convenient to construct those rather general grid structures by means of a computer. This explains the term "Computer Generated Moire" (CGM).

The CGM identification system mainly uses two kinds of computer generated grids, one called object grids, and the other, reference grids. An object grid is used as an information carrier. The necessary specific information for identification, such as the owner's signature or photograph, is read into a computer, which codes it into a grid, and then prints it on an I/D plate. It is impossible to find out the hidden information by merely inspecting this plate. However, the coded information will reappear when the I/D plate is placed in a read-out machine, where the reference grid decodes the coded information in the form of Moire patterns.

DETAILED DESCRIPTION OF THE INVENTION

The following is a description of an embodiment of this invention with respect to the drawings.

Figure 1:
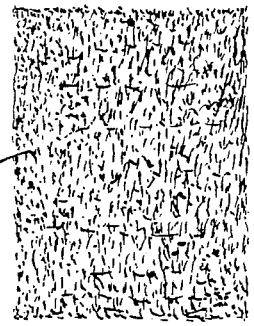
FIG. 1 is a plan view of a reference grid pursuant to the present invention.

FIG. 1 shows a reference grid 1 of the embodiment. As seen, the reference grid 1 contains lots of broken lines. The grid is designed to have the following characteristics:

(1) It mainly consists of broken lines, and each line is approximately parallel to adjacent broken lines; (2) the lines are broken randomly so that no parts of the reference grid 1 are the same, whereas at the same time, every part of the grid looks similar to the other parts on a glancing inspection.

Figure 2:
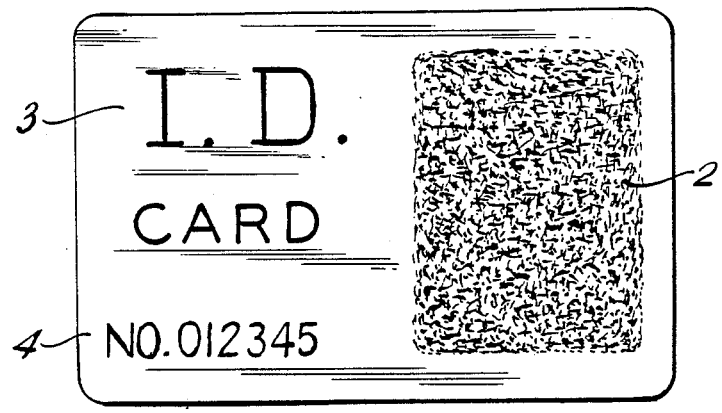
FIG. 2 is a plan view of an identification card in accordance with the present invention.

FIG. 2 shows an I/D card of the embodiment, on which there is an object grid 2, and some readily readable messages, including a card name 3, and a card number 4. The back of the card (not illustrated) may contain a magnetic strip, the owner's name and address, etc., at the same time. Owing to necessary considerations in generating the reference grid 1, and to the way of generating the object grid 2, the object grid 2 looks similar in overall appearance to the reference grid 1, and consequently, all object grids produced respecting a common reference grid look alike.

The object grid 2 is generated in such a way, that it satisfies the relation:

$$A(x,y) = \cos[f(x,y) - g(x,y)],$$

where (x,y) represents to the Cartesian co-ordinates of a point, A is the density (darkness), at that point of the picture taken as the original information to be coded, and f and g are the phases of the reference grid 1 and the object grid 2, respectively. The word "phase" mentioned here means the relative shift, and it changes for 360 degrees when the point moves for a distance between two adjacent lines.

Figure 3:
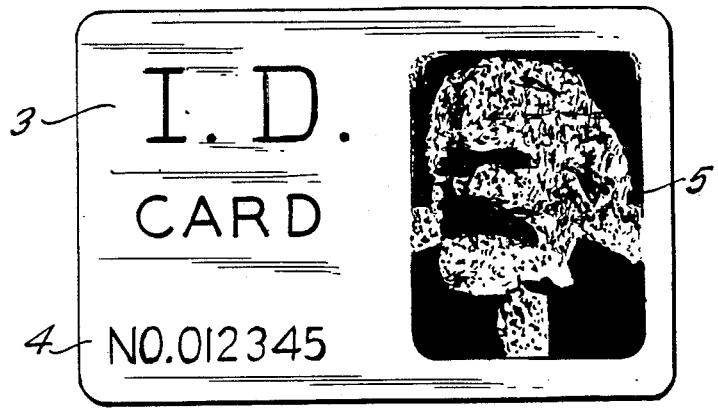
FIG. 3 is a plan view of the I/D card of FIG. 2, but as seen through the decoding or read-out machine of FIG. 4.

FIG. 3 is a plan view of the same I/D in FIG. 2, but this time as seen through a read-out machine. The coded information shows up in a Moire pattern 5. As can be seen, there is a light noise pattern as a background. This is a specific characteristic of Moire methods and this kind of noise can be automatically eliminated dropped by human eyes.

Figure 4:
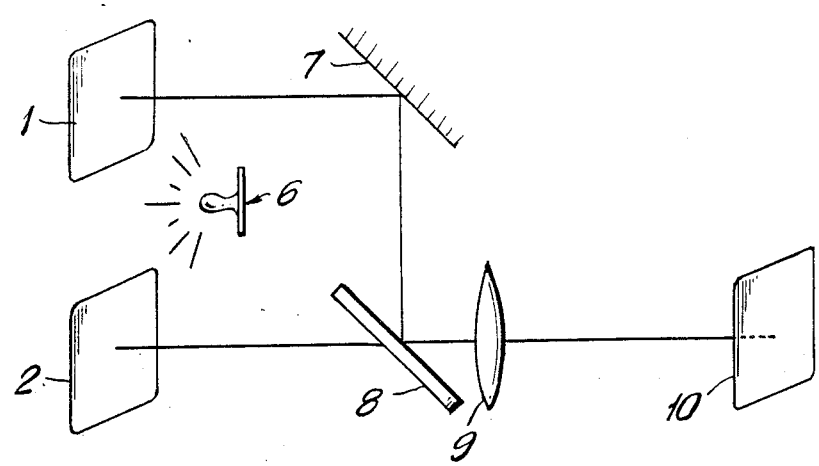
FIG. 4 is a diagrammatic view of a read-out machine, suitable for opaque grids.

The read-out machines can be very simple. FIG. 4 shows such a machine to decode with opaque grids. Both grids are illuminated by non-coherent light from a source 6. The light from the reference grid 1 is reflected by a mirror 7 and a splitter 8, while that from the object grid passes through the splitter 8. Both light beams are focused, by a lens 9, into images on a screen 10, one fitting or superimposed on the other. In case that one of the grids is transparent (i.e., a grid made on the transparent materials has an align mark so as to allow for alignment thereof), the read-out machine simply serves to locate the grids relative to one another, the transparent one on the top if there is only one, at the proper position, and to allow the operator to look on. These read-out machines need not to be very precise, for when the machine has the two grids approximately fitting one another, the Moire patterns show up, and the machine operator can very easily fine tune.

Figure 5:
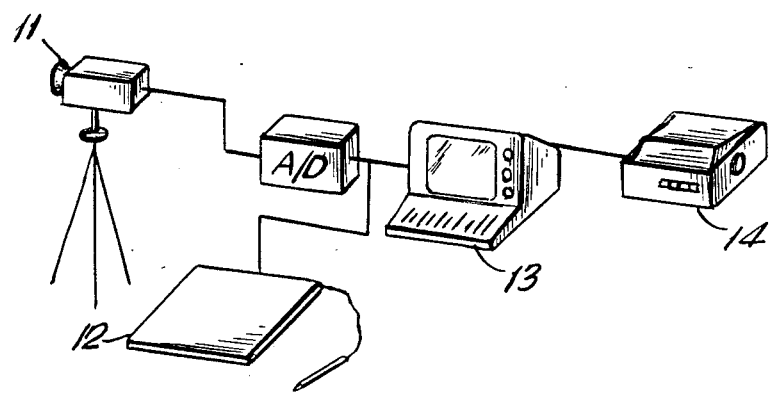
FIG. 5 is a diagrammatic view of an installation to produce the reference grids and the object grids according to the invention.

FIG. 5 is a diagrammatic view showing an installation to produce the reference grid 1 and the object grid 2. The specific information for identification can be read into a computer 13 by a video camera 11 for photographs, etc.) or a pen digitizer 12 (for signatures, e.g.). Then the input information is processed by the computer 13 to form coded grids, printed upon the I/D cards by a printer 14.

The CGM identification system possesses the following characteristics and advanges:

(1) SAFETY: No one can easily decode the secret information on such an I/D card and/or fabricate an I/D card of this kind for unlawful purposes. People in legal possession of lost or stolen I/D's cannot make use of them, while their specific information does not match with what has been coded.

(2) GENERAL APPLICATION: The identification plates can be independently produced by several authorized producers, such as banks and stores which issue I/D's. The original input pattern on an I/D will reappear on those machines, and only those machines, which are distributed by the organization that issued that I/D. Such grids cannot be decoded by other machines by other organizations using the same method for their own I/D's. Therefore, all organizations can use the method of the present invention to circulate their own sets of I/D's without mutual interference or confusion.

(3) CONVENIENCE: All I/D's with secret codes of the owner's specific information can be read out by use of the respective reference grid provided at the read-out machines. The identification plates can be made in two ways, i.e., transparent or opaque. In either case, the read-out machine can be used immediately by persons working with it. No special training is required for read-out machine operators.

(4) ECONOMICS: The read-out machines can be very simple and inexpensive. The process to produce such I/D's is almost as easy as issuing the presently used plastic cards. The equipment required to produce the I/D's is not costly.

(5) VERY BROAD UTILIZATION: This method may be used with credit cards, I. D. cards, passports, checks, and all other important and/or secret messages.

We claim:

1. An identification card wherein an image incorporating identifying information is encoded in an object grid mounted to the identification card, said object grid including a computer-generated pattern of broken lines produced from said image and from a reference grid including a random pattern of broken lines.

2. A method for manufacturing an identification card for enabling the identification of a predetermined pattern, said method comprising the steps of:
providing a reference grid including an at least substantially random pattern of broken lines;
generating by computer from said random pattern and said predetermined pattern an object grid including a pattern of broken lines; and
mounting said object grid to a base member.

3. A method as claimed in claim 2 wherein said object grid is generated to satisfy the relation:

$$A(x,y) = \cos[f(x,y) - g(x,y)],$$

where function A(x,y) represents a light intensity value of said predetermined pattern at a point (x,y) and where functions f(x,y) and g(x,y) are phase functions of said reference grid and said object grid, respectively.

4. A method for identifying a predetermined pattern, said method comprising the steps of:
providing a reference grid including an at least substantially random pattern of broken lines;
providing an object grid including a computer-generated pattern of broken lines produced from said random pattern and said predetermined pattern; and
superimposing an image of said random pattern and an image of said computer pattern to produce a visually detectable Moire image of said predetermined pattern.

5. A method as claimed in claim 4, further comprising the step of adjusting the relative positions of said image of said random pattern and said image of said computer-generated pattern so that said visually detectable Moire pattern appears.

* * * * *